(12) United States Patent
Liang

(10) Patent No.: US 10,514,821 B2
(45) Date of Patent: Dec. 24, 2019

(54) METHOD AND APPARATUS FOR RELOCATING AN ICON

(71) Applicant: SAMSUNG ELECTRONICS CO., LTD., Suwon-si (KR)

(72) Inventor: Furong Liang, Science City (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 758 days.

(21) Appl. No.: 14/827,879

(22) Filed: Aug. 17, 2015

(65) Prior Publication Data

US 2016/0162157 A1 Jun. 9, 2016

(30) Foreign Application Priority Data

Dec. 5, 2014 (CN) .......................... 2014 1 0736273
Apr. 21, 2015 (KR) ........................ 10-2015-0056009

(51) Int. Cl.
| | | |
|---|---|---|
| G06F 3/048 | (2013.01) | |
| G06F 3/0481 | (2013.01) | |
| G06F 3/0482 | (2013.01) | |
| G06F 8/65 | (2018.01) | |
| G06F 8/61 | (2018.01) | |
| G06F 3/0486 | (2013.01) | |
| G06F 9/451 | (2018.01) | |

(52) U.S. Cl.
CPC ........ *G06F 3/04817* (2013.01); *G06F 3/0482* (2013.01); *G06F 3/0486* (2013.01); *G06F 8/61* (2013.01); *G06F 8/65* (2013.01); *G06F 9/451* (2018.02)

(58) Field of Classification Search
CPC .. G06F 3/04817; G06F 3/0482; G06F 3/0486; G06F 3/0488; G06F 8/65; G06F 8/61; G06F 9/451

USPC .......................................................... 715/765
See application file for complete search history.

(56) References Cited

U.S. PATENT DOCUMENTS

2010/0107150 A1\* 4/2010 Kamada .................... G06F 8/65
717/170
2011/0239133 A1\* 9/2011 Duffus .................... G06F 9/461
715/753

(Continued)

FOREIGN PATENT DOCUMENTS

| CN | 102722359 A | 10/2012 |
|---|---|---|
| CN | 103699300 A | 4/2014 |

(Continued)

OTHER PUBLICATIONS

Communication dated Feb. 20, 2017, issued by the State Intellectual Property Office of People's Republic of China in counterpart Chinese Application No. 201410736273.2.

(Continued)

*Primary Examiner* — Scott T Baderman
*Assistant Examiner* — Hassan Mrabi
(74) *Attorney, Agent, or Firm* — Sughrue Mion, PLLC

(57) ABSTRACT

A method of controlling an electronic apparatus includes installing an application on the electronic apparatus or updating the application installed on the electronic application; displaying an icon of the installed or updated application in a relocatable state upon completion of the installing or updating; and relocating the icon in response to detecting an operation to relocate the icon and displaying the relocated icon.

19 Claims, 13 Drawing Sheets

(56) References Cited

U.S. PATENT DOCUMENTS

2011/0252372 A1* 10/2011 Chaudhri ............ G06F 3/04817
715/835
2012/0096386 A1* 4/2012 Baumann ........... G06Q 30/0601
715/772

FOREIGN PATENT DOCUMENTS

CN          103927100 A    7/2014
KR    10-2013-0101825 A    9/2013

OTHER PUBLICATIONS

Communication dated Oct. 20, 2017, issued by the State Intellectual Property Office of People's Republic of China in counterpart Chinese Application No. 201410736273.2.

* cited by examiner

METHOD AND APPARATUS FOR RELOCATING AN ICON

CROSS-REFERENCE TO RELATED APPLICATIONS

This application claims priority from Chinese Patent Application No. 201410736273.2, filed on Dec. 5, 2014, in the State Intellectual Property Office of the People's Republic of China, and Korean Patent Application No. 10-2015-0056009, filed on Apr. 21, 2015, in the Korean Intellectual Property Office, the disclosures of which are incorporated herein by reference in their entireties.

BACKGROUND

1. Field

Methods and apparatuses consistent with exemplary embodiments relate to relocating an icon of an application to be displayed.

2. Description of the Related Art

When a user installs applications on a mobile phone and other electronic devices, an icon of an application is usually displayed on an "Application" interface by default after the application is installed or updated.

When there are many icons on the "Application" interface, it may be very difficult for a user to find an icon of a desired application. Therefore, after the desired application is installed or updated, the icon for the desired application may be moved to a desktop such that the icon of the desired application may be easily identified. To this end, the user may find the icon of the installed or updated application on the "Application" interface and press the icon for a preset period of time. Then, the icon may be displayed as a draggable state. An electronic device may then, for example, jump-to-display the desktop, and the user may drag the icon to a desired location on the desktop.

However, after the application is installed or updated, the electronic device may not provide a location index indicating where the icon of the application is located. As a result, the user needs to find the icon of the application from the "Application" interface that includes many other application icons, which causes a more complicated process and great inconvenience.

SUMMARY

One or more exemplary embodiments provide a method and an apparatus for relocating an application icon to be displayed.

Additional aspects will be set forth in part in the description which follows and, in part, will be apparent from the description, or may be learned by practice of the exemplary embodiments.

According to an aspect of an exemplary embodiment, provided is a method of controlling an electronic apparatus, the method including: installing an application on the electronic apparatus or updating the application installed on the electronic application; displaying an icon of the installed or updated application in a relocatable state upon completion of the installing or updating; and relocating the icon in response to detecting an operation to relocate the icon and displaying the relocated icon.

The displaying the icon of the application in the relocatable state may include displaying the icon in a draggable state.

The displaying the icon of the application in the relocatable state may include displaying the icon in at least one of a vibrating state and a suspended state.

The displaying the icon of the application in the relocatable state may include displaying the icon to be transparent.

The displaying the icon of the application in the relocatable state may include displaying the icon in the relocatable state on a preset page of a target interface of the electronic apparatus.

The displaying the icon of the application in the relocatable state may include: displaying the icon in the relocatable state on a first interface for installing or updating the application; and displaying the icon in the relocatable state on a preset page of a second interface in response to the completion of the installing or the updating.

The preset page may correspond to a same category page on which at least one icon corresponding to at least one application that is in the same category as the installed or updated application is displayed.

The preset page may correspond to an expanded page of an application folder, the application folder being a folder including at least one icon corresponding to at least one application that is in the same category as the installed or updated application.

The expanded page may correspond to a page that is displayed in response to selection of the application folder.

The displaying the icon of the application in the relocatable state may include displaying the icon in a first area of a screen, separate from a second area of the screen in which a page of an interface is displayed, wherein existing icons are disposed on the page of the interface.

In response to a change to the page of the interface, the icon in the first area may remain displayed on the screen.

According to an aspect of an exemplary embodiment, provided is an electronic apparatus including: a touch screen configured to detect a touch operation of a user; and a processor, wherein the processor is configured to install an application on the electronic apparatus or update the application installed on the electronic apparatus, display an icon of the installed or updated application in a relocatable state on the touch screen upon completion of installing or updating of the application, relocate the icon to a target location according to an operation to relocate the icon, and display the relocated icon on the touch screen.

The processor may be configured to display the icon in a draggable state.

The processor may be configured to display the icon in at least one of a vibrating state and a suspended state.

The processor may be configured to display the icon in a transparent state.

The processor may be configured to display the icon in the relocatable state on a preset page of a target interface.

The processor may be configured to display the icon in the relocatable state on a first interface for installing or updating the application, display the icon in the relocatable state on a preset page of a second interface in response to the completion of the installing or the updating.

The preset page may correspond to a same category page on which at least one icon corresponding to at least one application that is in the same category as the installed or updated application is displayed.

The preset page may correspond to an expanded page of an application folder, the application folder being a folder including at least one icon corresponding to at least one application that is in the same category as the installed or updated application.

The expanded page may correspond to a page that is displayed in response to selection of the application folder.

The processor may be configured to display the icon in a first area of a screen, separate from a second area of the screen in which a page of an interface is displayed, wherein existing icons are disposed on the page of the interface.

In response to a change to the page of the interface, the processor may be configured to control the icon in the first area to remain displayed on the screen.

According to an aspect of an exemplary embodiment, provided is a non-transitory computer-readable recording medium having recorded thereon a program, which, when executed by a computer, causes the computer to perform the above method.

According to an aspect of an exemplary embodiment, provided is an apparatus including: one or more processors; a memory; and a program stored in the memory and configured to be executed by the one or more processors, wherein the program causes the one or more processors to: in response to a first application being installed on the apparatus or an update of the first application installed on the apparatus, determine a page, among a plurality of pages of an interface, based on a property of the first application, and display a first icon corresponding to the first application on the determined page.

The program may further cause the one or more processors to determine the page based on a comparison between the property of the first application and a property of at least one second application installed on the apparatus.

The program may further cause the one or more processors to determine the page in response to determining that the at least one second application is related to the first application according to a result of the comparison, and display the first icon on the determined page.

The program may further cause the one or more processors to display the first icon on the determined page with an indication that the first icon is movable.

The program may further cause the one or more processors to determine a target interface among two or more interfaces, and determine the page among a plurality of pages of the determined target interface.

The two or more interfaces may include a desktop interface and an application interface of the apparatus.

BRIEF DESCRIPTION OF THE DRAWINGS

The above and/or other aspects will become apparent and more readily appreciated by describing certain exemplary embodiments with reference to the accompanying drawings in which.

DETAILED DESCRIPTION

Reference will now be made in detail to exemplary embodiments, examples of which are illustrated in the accompanying drawings. Hereinafter, the term "and/or" includes any and all combinations of one or more of the associated listed items. Expressions such as "at least one of," when preceding a list of elements, modify the entire list of elements and do not modify the individual elements of the list.

The present specification provides exemplary embodiments of methods of relocating an icon to be displayed. The methods are applied to electronic devices, for example, mobile phones, smart phones, desktop computers, wearable devices, and tablet computers.

Figure 1:
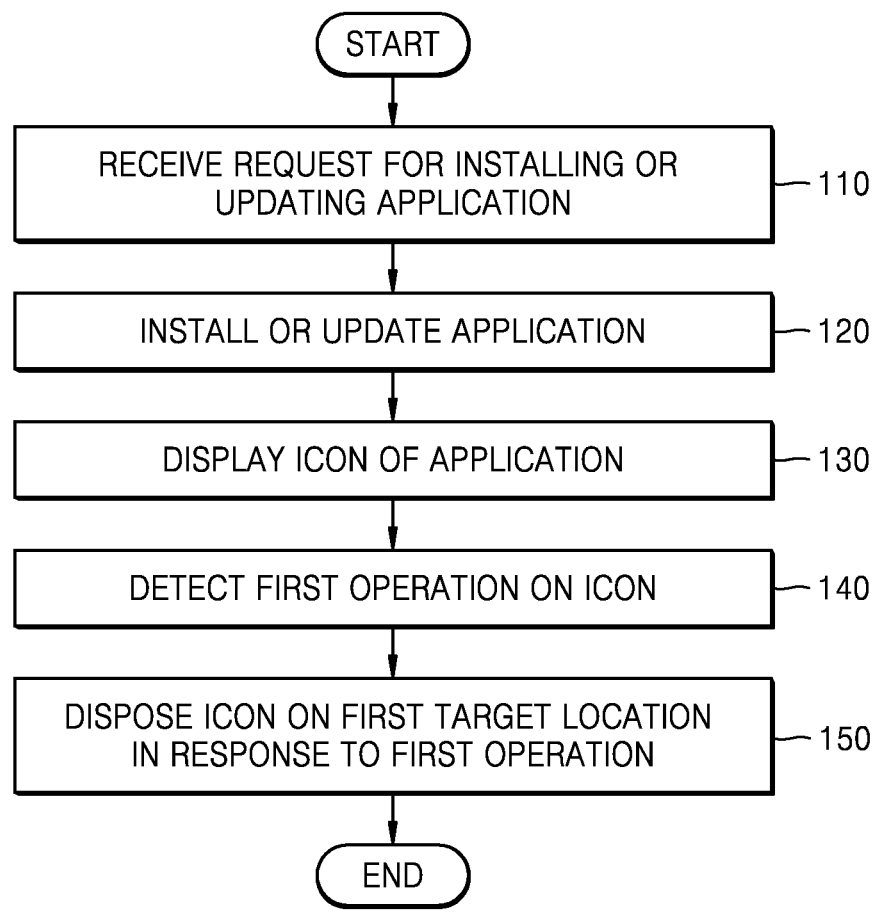
FIG. 1 is a flowchart of a method of relocating an icon, according to an exemplary embodiment.

FIG. 1 is a flowchart of a method of relocating an icon, according to an exemplary embodiment. As shown in FIG. 1, in operation 110, an electronic device receives a request for installing or updating an application. In operation 120, the electronic device installs or updates the application.

When a user needs to install or update the application in the electronic device, the user may run an application for downloading the application. The electronic device may receive a request for installing or updating from the user.

The request for installing or updating the application may include, but is not limited to, at least one of application identification information, application installation information, and application update information.

The electronic device may perform the installing or the updating of the application based on the received request from the user.

Installing or updating the application in the electronic device is not limited to exemplary embodiments. Methods of installing or updating applications are well-known to one of ordinary skill in the art, and may be modified depending on embodiments. Thus, detailed descriptions of installing or updating the application will be omitted.

In operation 130, the electronic device displays an icon of the application. Icons are used for distinguishing applications from each other and may have different forms according to the applications.

Furthermore, the icons may be software icons and/or widget icons, but are not limited thereto. Because the software icons and the widget icons are well-known to one of ordinary skill in the art, detailed descriptions thereof will be omitted.

To facilitate locating an icon of an application, the icon may be displayed on the electronic device during a process of installing or updating the application or after the application is installed or updated. Specifically, the electronic device may display the icon on a page that may be, but is not limited to, a default page for the icon.

Furthermore, the electronic device may display the icon in a relocatable state, but is not limited thereto. The relocatable state may be different from a current icon display state in which an existing application is displayed.

For example, the electronic device may display the icon in a draggable state. Accordingly, the icon may be dragged according to a drag operation on the icon by the user. Alternatively, the electronic device may display the icon in a jiggling state or a suspended state. In order to help the user to quickly recognize that the icon is draggable, the electronic device may display the icon in the jiggling state. In other words, the electronic device may display the icon in a vibrating state. When the user changes a page displayed on the electronic device, to display the icon on the changed displayed page, the icon may be provided in the suspended state. The icon in the suspended state may be disposed on the changed displayed page.

Alternatively, the electronic device may display the icon in both the jiggling state and the suspended state. In other words, the electronic device may display the icon to vibrate in the suspended state.

Alternatively, the electronic device may display the icon to be transparent.

In operation 140, the electronic device detects a first operation on the icon.

The electronic device may receive a relocating operation, i.e., the first operation, with respect to the icon from the user. The first operation refers to an operation of moving the icon, such as dragging the icon with a finger of the user.

As an exemplary embodiment, a user may press a virtual button or a physical button to move the icon, or the user may select or change an interface and a page on which the icon is to be displayed. In particular, after the icon is selected by the user, the electronic device may, for example, display a drop-down menu. In other words, when the icon is selected, the electronic device may display a plurality of options, and the electronic device may select at least one of the plurality of options according to an input of the user. The drop-down menu may include, but is not limited to, a plurality of interface options. The user may select an option that corresponds to a desired interface. Interface options may include, but is not limited to, a primary interface and a secondary interface. The primary interface may be a desktop interface, and the secondary interface may be an application interface. Each interface may include at least one page. When the user selects an interface option to select a corresponding interface, the electronic device may additionally display a sub-menu that includes, but is not limited to, a plurality of page options corresponding to the selected interface. The user may select an option that corresponds to a page in which the icon of the application is to be located. Because interfaces and pages are well-known to one of ordinary skill in the art, detailed descriptions thereof will be omitted herein.

In operation 150, the electronic device locates the icon at a first target location in response to the first operation.

For example, the electronic device may initially locate the icon at a default location, e.g., at a first location of a second page of the desktop interface or at a last location of a last page of the application interface.

According to an exemplary embodiment, when the icon is located on a currently displayed page, the electronic device may move the icon to the first target location according to an input of the user. When the icon is to be relocated on a preset page that is different from the currently displayed page, the electronic device may jump-to-display the preset page and may display the icon on the preset page. Also, the electronic device may display the icon on a first target location of the preset page. 'Jumping-to-display a page' refers to a process of displaying another page by the electronic device. In other words, 'jumping-to-display' indicates that the electronic device that previously displayed a first page now displays a second page. For example, when a first page of a desktop is currently displayed and an icon of an application is desired to be displayed on the second page, the user may drag the icon to a right edge of a display area, and if the icon stays at the right edge for a preset period of time, the electronic device may automatically jump-to-display the second page. To dispose the icon at the first target location on the second page, the user may move and release the icon at the first target location. Alternatively, the electronic device may determine whether the icon maintains a dragged state for a preset time on a preset location. When the icon maintains the dragged state for the preset time on the preset location, the electronic device may jump-to-display the second page and dispose the icon at a location where the user drags and drops the icon.

Detecting the first operation and disposing the icon at the first target location in response to the first operation are not limited to the above-described exemplary embodiment and may be modified depending on embodiments. Therefore, detailed description thereof will be omitted herein.

Referring back to operation 130, if the electronic device fails to detect the first operation within a preset period of time after the icon is displayed, the electronic device may cancel the displaying of the icon and dispose the icon at a default location. For example, the electronic device may display the icon at a last location of a last page of the application interface. That is, if the user fails to move the icon or perform other operations on the icon within a preset period of time after the icon is displayed, the displaying of the icon may be cancelled and the icon may be disposed at the default location.

Specifically, after the icon is displayed, the electronic device may start a timer. When the timer is timed out, the displaying of the icon may be cancelled. A time interval of the timer may be, for example, about five seconds to ten seconds. However, the time interval is not limited thereto, and may be freely set depending on embodiments. Methods of cancelling the displaying of the icon may include, but is not limited to, a method of moving the icon in a certain direction until the icon is completely removed from a display screen, a method of gradually increasing transparency of the icon until the icon is completely transparent; and a method of displaying a prompt box for inquiring as to whether to continue displaying the icon when the timer is timed out, and displaying the icon and restarting the timer if the user chooses to continue to display the icon or cancelling the displaying of the icon if the user selects to cancel the displaying of the icon. The time interval of the timer may be a preset interval or a time interval provided by the user.

For example, the electronic device may display an icon of an application after the application is installed or updated according to a request for installing or updating the application. The icon may be displayed at a first target location according to a detected first operation. The icon may be displayed according to exemplary embodiments of operation 130 of FIG. 1.

Figure 2:
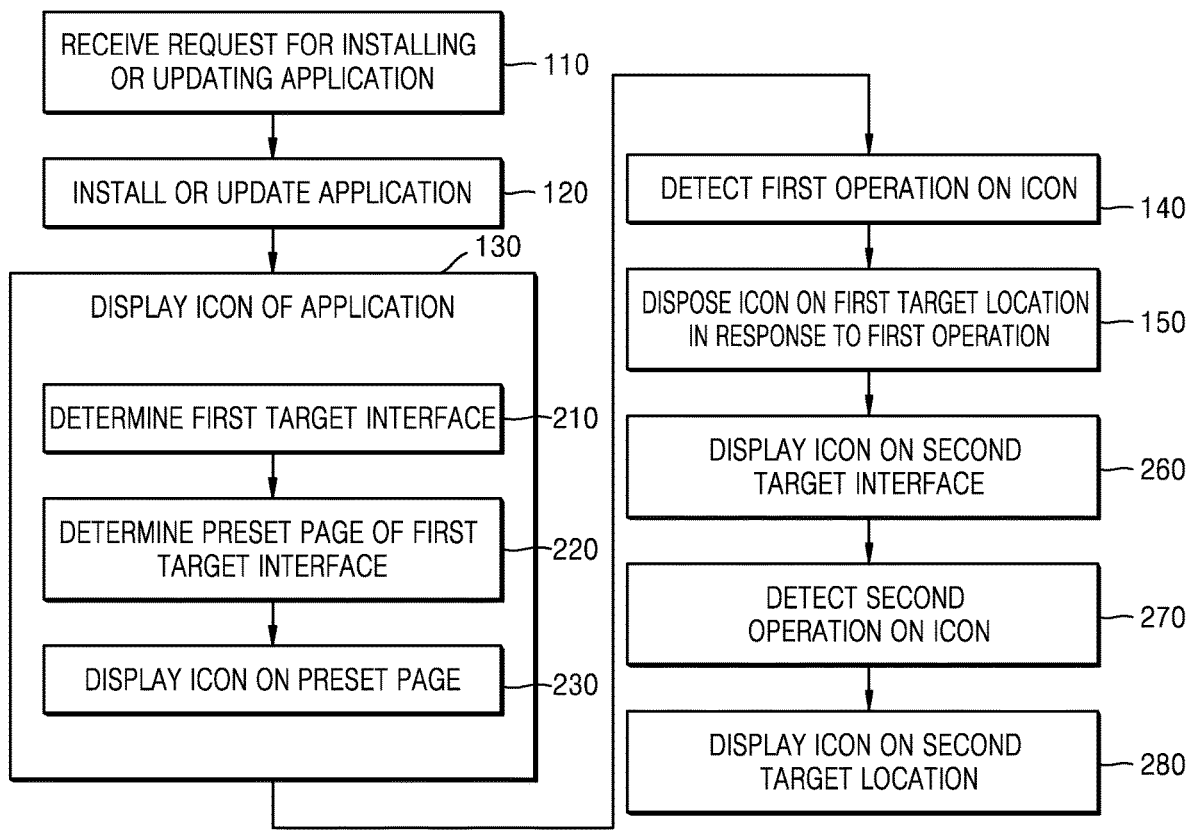
FIG. 2 is a flowchart of a method of relocating an icon, according to another exemplary embodiment.

FIG. 2 is a flowchart of a method of displaying an icon of an application, according to another exemplary embodiment.

As shown in FIG. 2, operation 130 in FIG. 1 may include operations 210 to 230. In operation 210, a first target interface is determined.

According to an exemplary embodiment, the first target interface may be a default interface, but is not limited thereto. Specifically, the electronic device may preset the default interface, and dispose an icon of an application on the default interface after the application is installed or updated. The default interface may be, but is not limited to, a desktop interface or an application interface.

The first target interface may include at least one page, and the icon may be displayed on a certain page. In operation 220, the electronic device may determine a preset page of the first target interface.

In operation 230, the electronic device may display the icon on the preset page.

The preset page may be, but is not limited to, a default page. The default page may be, but is not limited to, a first page, a last page, a page in a free area, or a same category page. The free area may refer to an area where no icon is currently displayed. The same category page may include a page on which at least one icon of at least one application that is in the same category as the installed or updated application is displayed.

In addition, the same category page may be an expanded page of an application folder, but is not limited thereto.

An example of an icon of a shopping application will be described for illustrative purposes. When the icon of the shopping application needs to be disposed on the desktop interface, the electronic device may search all of the pages of the desktop interface to determine whether the desktop interface includes a same category page of the shopping application. That is, the electronic device may determine a presence of a page that includes the icon of the shopping application in the desktop interface or a presence of a page that includes a shopping application folder. If the desktop interface includes three pages and a second page includes the shopping application folder that includes a plurality of icons of shopping applications, the electronic device may determine the second page of the desktop interface or an expanded page of the shopping application folder to be a preset page, and display the icon of the shopping application on the preset page. In this case, the preset page may be the second page or the expanded page of the shopping application folder. The expanded page of the shopping application folder may be a page for displaying the icons of the shopping applications included in the shopping application folder.

Figure 3A:
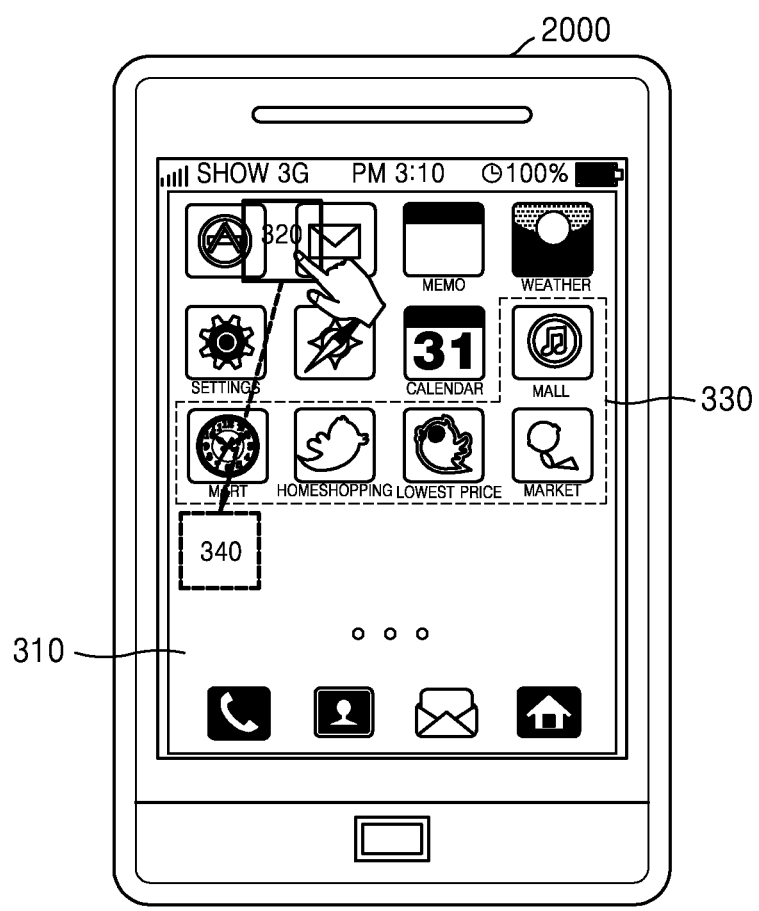
FIG. 3A is a schematic diagram of an exemplary embodiment of an electronic device relocating an application icon on a same category page.

FIG. 3A is a schematic diagram of an exemplary embodiment of an electronic device 2000 relocating an icon of an application on a same category page.

As shown in FIG. 3A, a second page 310 of a desktop interface includes icons 330 of five shopping applications. Accordingly, the electronic device 2000 determines that the second page 310 is a same category page of a shopping application. When the shopping application is installed, the electronic device 2000 may directly jump-to-display the second page 310 of the desktop interface and may display an icon 320 of the shopping application. For example, when a plurality of pages include an icon of the shopping application, the electronic device 2000 may select a page having a greatest number of icons of the shopping applications and display the icon 320 of the shopping application on the selected page.

The icon 320 may be, but is not limited to, in a suspended state. To avoid affecting the user from browsing a currently displayed page, the electronic device 2000 may transparently display the icon 320. For example, transparency of the icon 320 may be set to 50%.

The user may move and release the icon 320 at a second location (e.g., last location) 340 of the second page 310. The electronic device 2000 may detect a touch, drag, and drop operation that is performed on the icon 320 by the user, and dispose the icon 320 at a location corresponding to the drop operation. The drop operation indicates that the touch operation of the user has ended. In other words, a locating operation of the icon 320 is presumed to be finished. When the locating operation of the icon 320 is finished, the electronic device 2000 may display the icon 320 on the second location 340, and set the transparency of the icon 320 to 0%. Accordingly, the icon 320 may be displayed in the same transparency level as other application icons.

Although FIG. 3A shows that the icon 320 is initially displayed at a position above other application icons, the electronic device 2000 may display the icon 320 in a relocatable state in an area that is adjacent to the icons 330 of the applications that are in the same category as the application. For example, the electronic device 2000 may display the icon 320 at the second location 340 in a relocatable state. Alternatively, the electronic device 2000 may display the icon 320 to be overlapped with the icons 330 in a relocatable state.

Figure 3B:
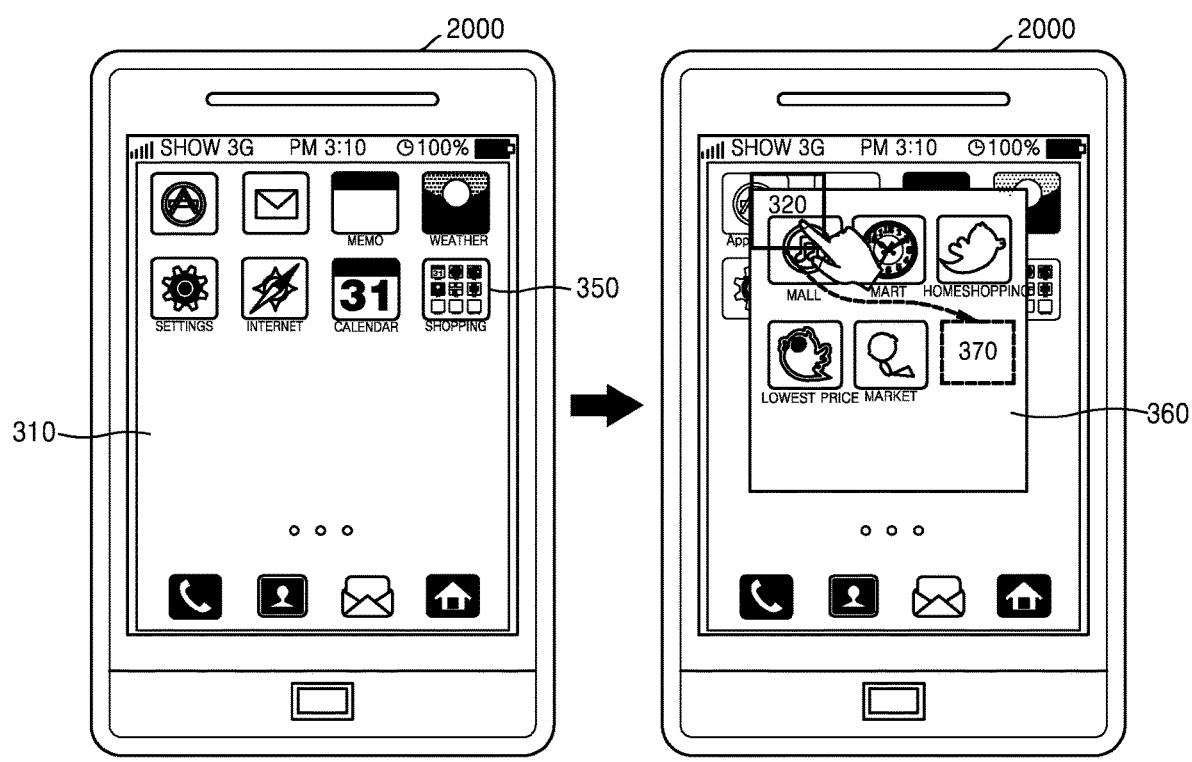
FIG. 3B is a schematic diagram of an exemplary embodiment of an electronic device relocating an application icon on an expanded page of an application folder.

FIG. 3B is a schematic diagram of another exemplary embodiment of the electronic device 2000 relocating an icon of an application on an expanded page of an application folder.

As shown in FIG. 3B, the second page 310 includes an application folder 350 that includes icons of five shopping applications. When a shopping application is installed in the electronic device 2000, the electronic device 2000 may directly jump-to-display an expanded page 360 of the application folder 350, and may display the icon 320 on the expanded page 360 in a relocatable state. The user may move and release the icon 320 at a third location (e.g., last location) 370 of the expanded page 360. Accordingly, the electronic device 2000 may display the icon 320 at the third location 370.

For example, the electronic device 2000 may automatically display the icon 320 on a preset page after the shopping application is installed or updated. Alternatively, during or after the installing or updating of the shopping application, the electronic device 2000 displays the icon 320 on a preset page in response to a user's triggering operation to locate the icon 320.

The electronic device 2000 may compare properties of an installed or updated application with properties of existing applications or a folder of applications, and determine a same category page of the installed or updated application.

Figure 4:
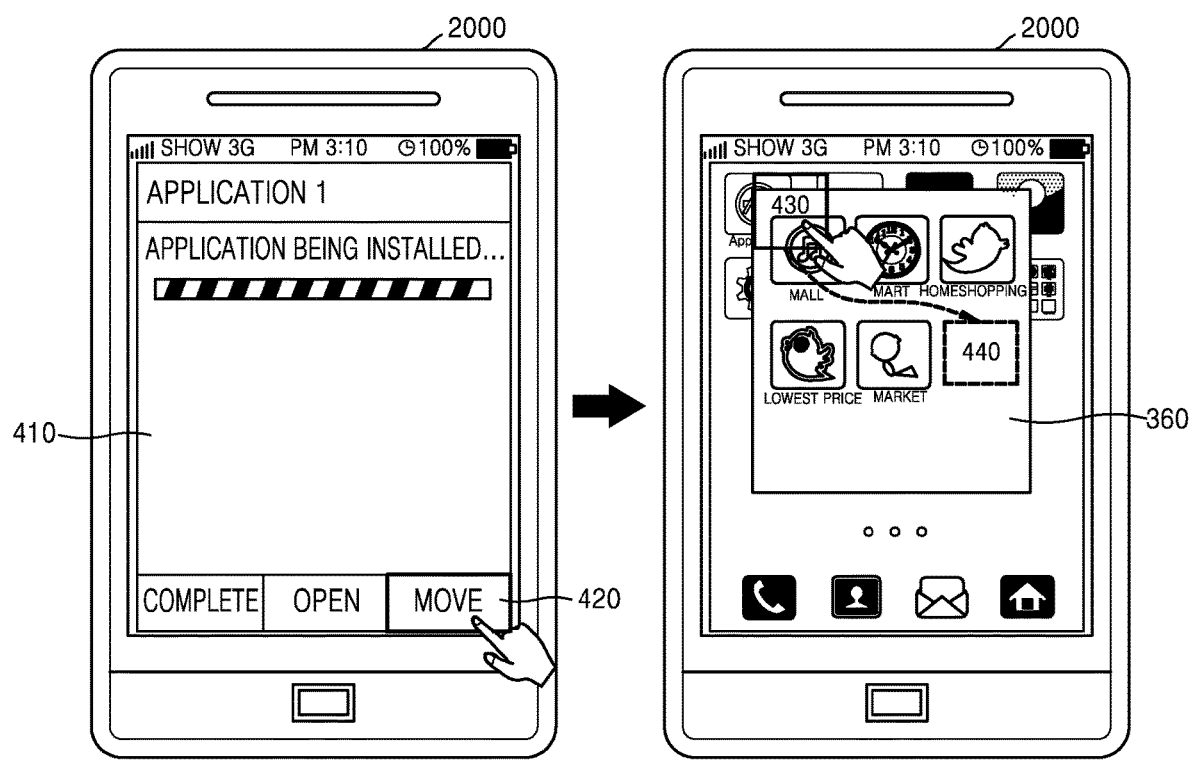
FIG. 4 is a schematic diagram of an exemplary embodiment of an electronic device displaying an icon of an application during a process of installing or updating the application.

FIG. 4 is a schematic diagram of an exemplary embodiment of the electronic device 2000 displaying an icon of an application on a same category page in response to a triggering operation of the user during a process of installing or updating the application.

As shown in FIG. 4, the electronic device 2000 displays an interface 410 for indicating that an application is being installed. The interface 410 may include, but is not limited to, a 'move' key 420 and other function keys. After the user selects the 'move' key 420, i.e., after the user initiates a triggering operation, the electronic device 2000 may display an icon 430 of the application on a preset page. For example, in response to the triggering operation of the user, the electronic device 2000 may display the icon 430 on the expanded page 360 of the application folder 350 of FIG. 4. The user may move and release the icon 430 at a fourth location (e.g., last location) 440 of the expanded page 360. Accordingly, the icon 430 may be disposed at the fourth location 440. The electronic device 2000 may detect a touch, drag, and drop operation that is performed on the icon 430 by the user, and dispose the icon 430 at the fourth location 440 where the icon 430 is dropped.

Figure 5:
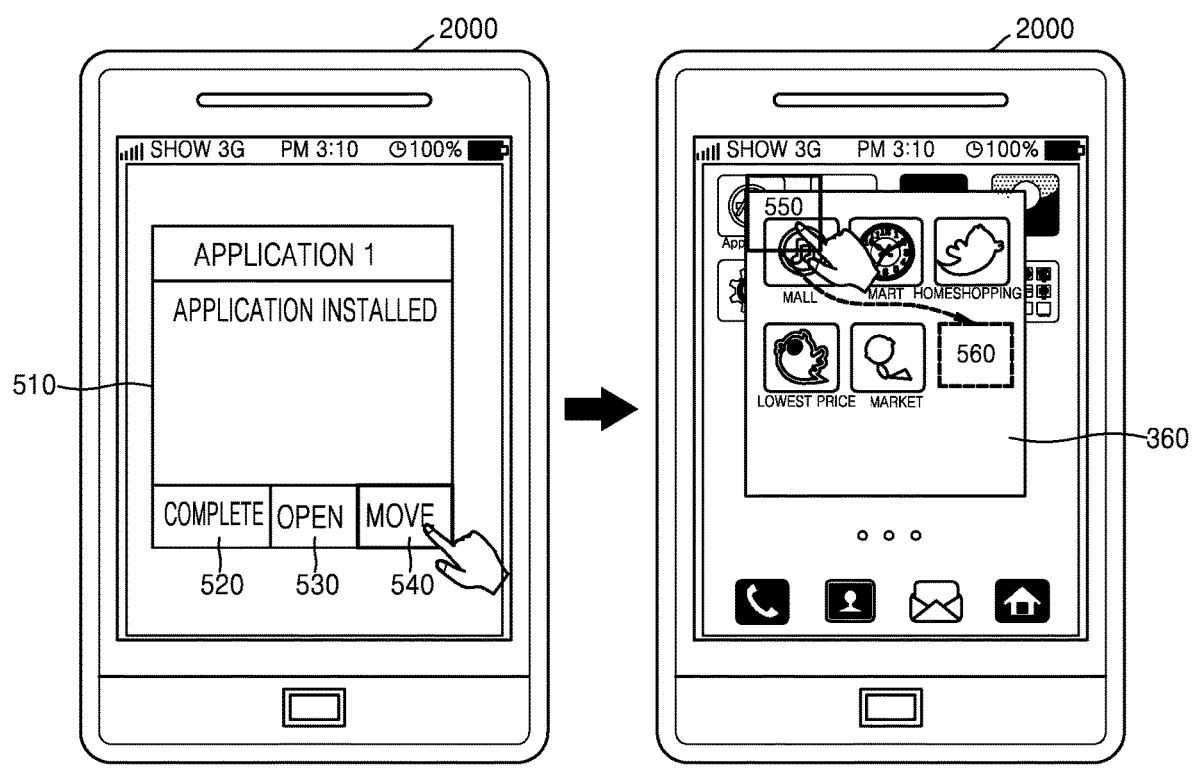
FIG. 5 is a schematic diagram of an exemplary embodiment of an electronic device displaying an icon of an application on an expanded page of an application folder after the application is installed or updated.

FIG. 5 is a schematic diagram of an exemplary embodiment of an electronic device 2000 displaying an icon of an application on a same category page in response to a triggering operation of the user after the application is installed or updated.

As shown in FIG. 5, after an application 1 is installed, the electronic device 2000 may display a prompt box 510 to inform that the application 1 has been installed. The prompt box 510 may include, but is not limited to, a 'complete' key 520, an 'open' key 530, a 'move' key 540, or other function keys. When the user touches the 'move' key 540, the electronic device 2000 may display an icon 550 of the application 1 on a preset page. For example, in response to an operation of the user, the electronic device 2000 may display the icon 550 on the expanded page 360 of the application folder 350, as shown in FIG. 3B. The user may move the icon 550 to a fifth location (e.g., last location) 560 by touching and dragging, and releasing the icon 550 at the fifth location 560 on the expanded page 360. Accordingly, the icon 550 may be disposed at the fifth location 560. Alternatively, when the user selects the 'open' key 530, the electronic device 2000 may also perform an operation in response to the selection, and may open the application 1 after the icon 550 is disposed at the fifth location 560. In other words, the electronic device 2000 disposes the icon 550 at the fifth location 560 and opens (i.e., executes) the application 1. In an exemplary embodiment, the electronic device 2000 may automatically executes the application 1 in response to the application 1 being installed or updated.

In an exemplary embodiment, in operation 130 of FIG. 1, the electronic device 2000 may display an icon of an application directly on a preset page, or may display an icon of an application on an installation interface or an update interface first and display the icon on the preset page. The installation interface may be, but is not limited to, a page that is displayed during an installation process or a page that is displayed after the installation process. The update interface may be, but is not limited to, a page that is displayed during an update process or a page that is displayed after the update process.

In an exemplary embodiment, the displaying of the icon on the installation interface or the update interface and then displaying the icon on the preset page may include, but is not limited to, displaying the icon on the installation interface or the update interface, detecting a second operation on the icon displayed on the installation interface or the update interface, and jumping-to-display the preset page and displaying the icon on the preset page in response to the second operation.

The second operation may include, but is not limited to, clicking the icon, double-clicking the icon, and pressing the icon for a preset time. Also, the icon may be moved according to an operation of the user. For example, the icon may be moved according to a movement of a user's finger. The electronic device 2000 may move the icon according to the touch and drag operation of the user.

Figure 6:
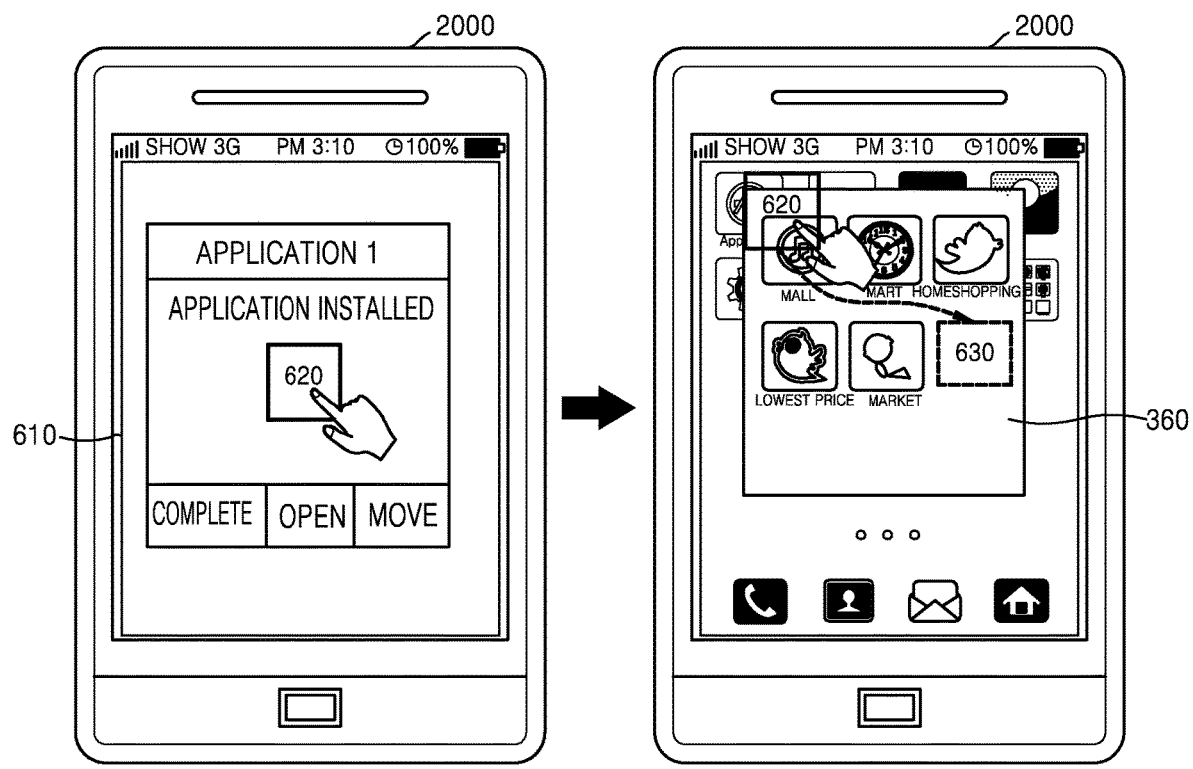
FIG. 6 is a schematic diagram of an exemplary embodiment of an electronic device displaying an icon of an application on an installation interface and then displaying the icon on a preset page.

FIG. 6 is a schematic diagram of an exemplary embodiment of the electronic device 2000 displaying an icon of an application on an installation interface and then displaying the icon on a preset page.

In FIG. 6, the expanded page 360 of the application folder 350 is provided as an example of a preset page. After the application 1 is installed, the electronic device 2000 may automatically display an icon 620 on a page 610 that is displayed after the application 1 is installed. The page 610 may include indication that the installation of the application 1 is finished. When a user touches the icon 620 or touches and drags the icon 620, the electronic device 2000 may automatically jump-to-display the expanded page 360 of the application folder 350, and may display the icon 620 on the expanded page 360 in a relocatable state. In other words, the electronic device 2000 may convert the page 610 displayed on a screen to a desktop interface including the expanded page 360, and display the icon 620 on the expanded page 360 in a relocatable state. The user may move and release the icon 620 at a sixth location (e.g., last location) 630 of the expanded page 360. Accordingly, the icon 620 may be disposed at the sixth location 630.

For example, the electronic device 2000 may display the icon 620 at a random location of a preset page or display the icon 620 at a preset location. The preset location may be an area that overlaps a currently displayed page. That is, a display area of the icon 620 may overlap a portion of the currently displayed page.

Figure 7:
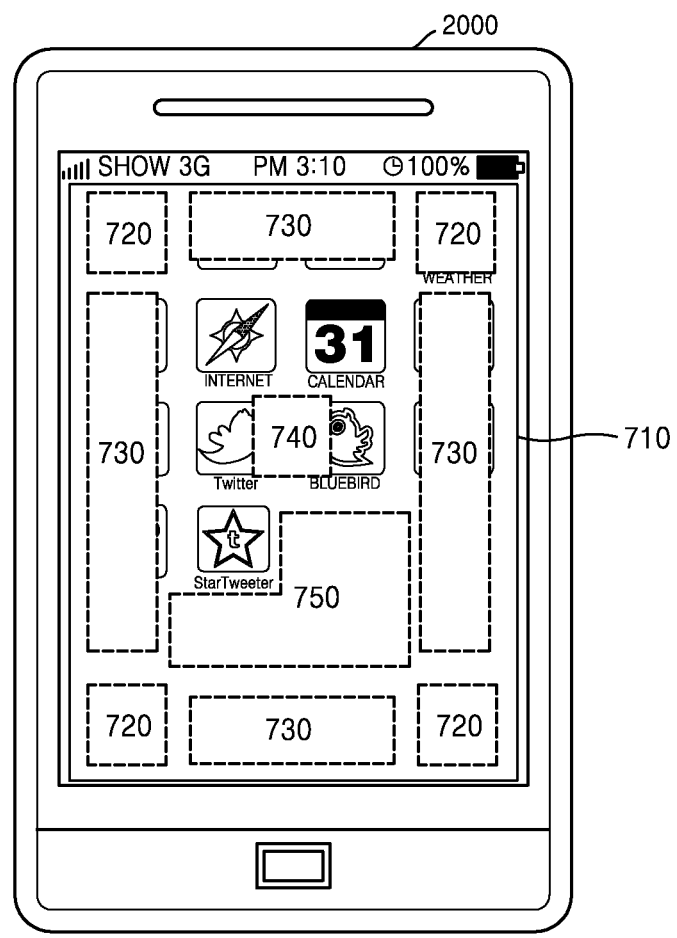
FIG. 7 is a schematic diagram of an exemplary embodiment of an electronic device displaying an icon of an application in an area that overlaps a currently displayed page.

FIG. 7 is a schematic diagram of an exemplary embodiment of the electronic device 2000 displaying an icon of an application in an area that overlaps a currently displayed page.

As shown in FIG. 7, the electronic device 2000 may display an icon of an application at a preset location of a currently displayed page 710. The preset location may include, but is not limited to, corner areas 720, random edge areas 730, a center area 740, and a free area 750, in which no icon and/or text is displayed.

The preset location may further include an area (hereinafter, "independent area") that is independent from the currently displayed page 710. The independent area may not overlap the currently displayed page. That is, the electronic device 2000 may display an application icon and the currently displayed page as separate screens. The independent area may remain displayed when the currently displayed page is switched, and thus, the application icon in the independent area may be moved and disposed on the currently displayed page that is switched.

Figure 8:
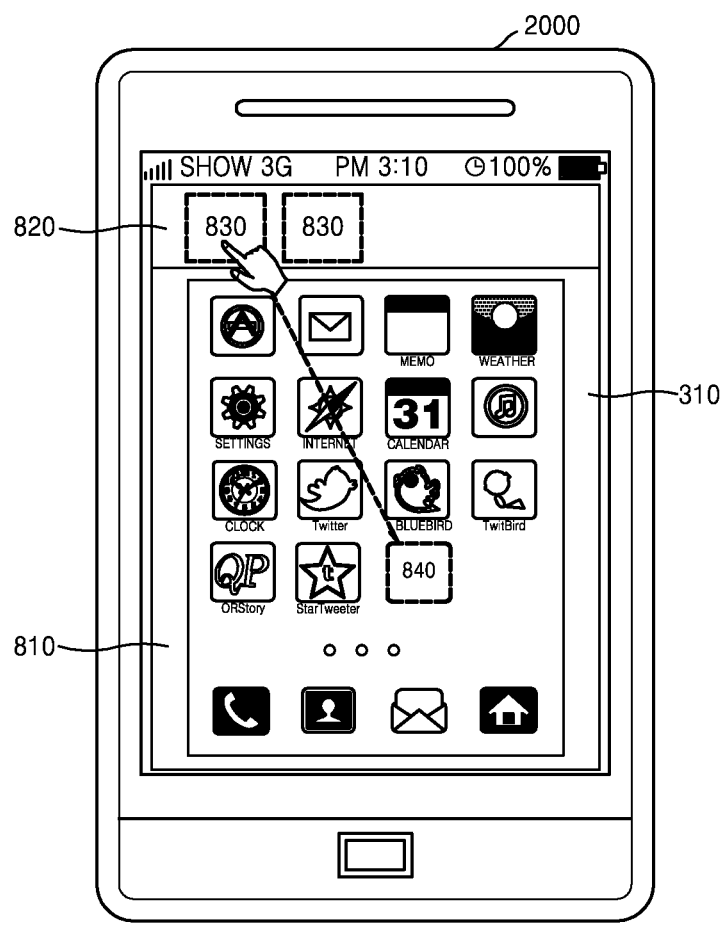
FIG. 8 is a schematic diagram of an exemplary embodiment of an electronic device displaying an icon of an application in an area that is independent from a currently displayed page.

FIG. 8 is a schematic diagram of an exemplary embodiment of the electronic device 2000 displaying an icon of an application in an area that is independent from a currently displayed page.

In FIG. 8, for example, the same category page 310 as shown in FIG. 3A is determined as a preset page. When the electronic device 2000 detects a triggering operation, the electronic device 2000 may jump-to-display the same category page 310. The electronic device 2000 may include two independent areas 810 and 820, but is not limited thereto. From among the independent areas 810 and 820, the independent area 810 is used to display the same category page 310. In other words, the electronic device 2000 may display the same category page 310 on the independent area 810. In response to a sliding operation or other operations performed by the user, the electronic device 2000 may change pages that are displayed on the independent area 810. The independent area 820 is used to display an icon 830 of an installed or updated application, and may maintain an identical screen when the same category page 310 that is displayed in the independent area 810 is changed. In other words, when a different page is displayed in the independent area 810, the electronic device 2000 continues to display the icon 830 in the independent area 820. When the user clicks the icon 830, double-clicks the icon 830, or presses the icon 830 for a preset time, the icon 830 may be moved to and released at a seventh location (e.g., last location) 840 of a currently displayed page (i.e., the same category page 310). Accordingly, the icon 830 may be disposed at the seventh location 840.

If application icons to be disposed include at least two icons, the two icons may be disposed on the same page or different pages of an identical interface. An example of disposing two application icons is described below.

When the electronic device 2000 disposes one of two application icons at a first target location, the electronic device 2000 may continue to display another application icon in a relocatable state (e.g., suspended state) on the independent area 820. The electronic device 2000, in response to an operation of the user, which is performed on the other application icon, may display the other application icon at a location that is different from the first target location of the currently displayed page or display the other application icon at a page that is different from the currently displayed page. Alternatively, after the electronic device 2000 disposes one of the two application icons at the first target location, the electronic device 2000 may automatically jump-to-display a current interface or a preset page that is different from the currently displayed page. The electronic device 2000 may display the other application icon on the preset page. The preset page may include, but is not limited to, a first page, a last page, a same category page, and a page that includes a free area.

If there are at least two application icons to be disposed, the at least two application icons may be respectively disposed on different interfaces. If there is only one application icon to be disposed, the application icon may be disposed on different interfaces. To facilitate the user to perform operations, after an application icon is disposed at the first target location of a current interface, the electronic device 2000 may further provide an access path for disposing application icons on a preset interface that is different from the current interface.

Referring back to FIG. 2, in operation 260, an application icon may be displayed on a second target interface. In operation 270, a second operation about the application icon may be detected. In operation 280, the application icon may be disposed on a second target location of the second target interface in response to the second operation.

Examples of operations 260 to 280 are similar to those of operations 130 to 150. Thus, the above-described features related to operations 130 to 150 may also be applied to operations 260 to 280.

Figure 9:
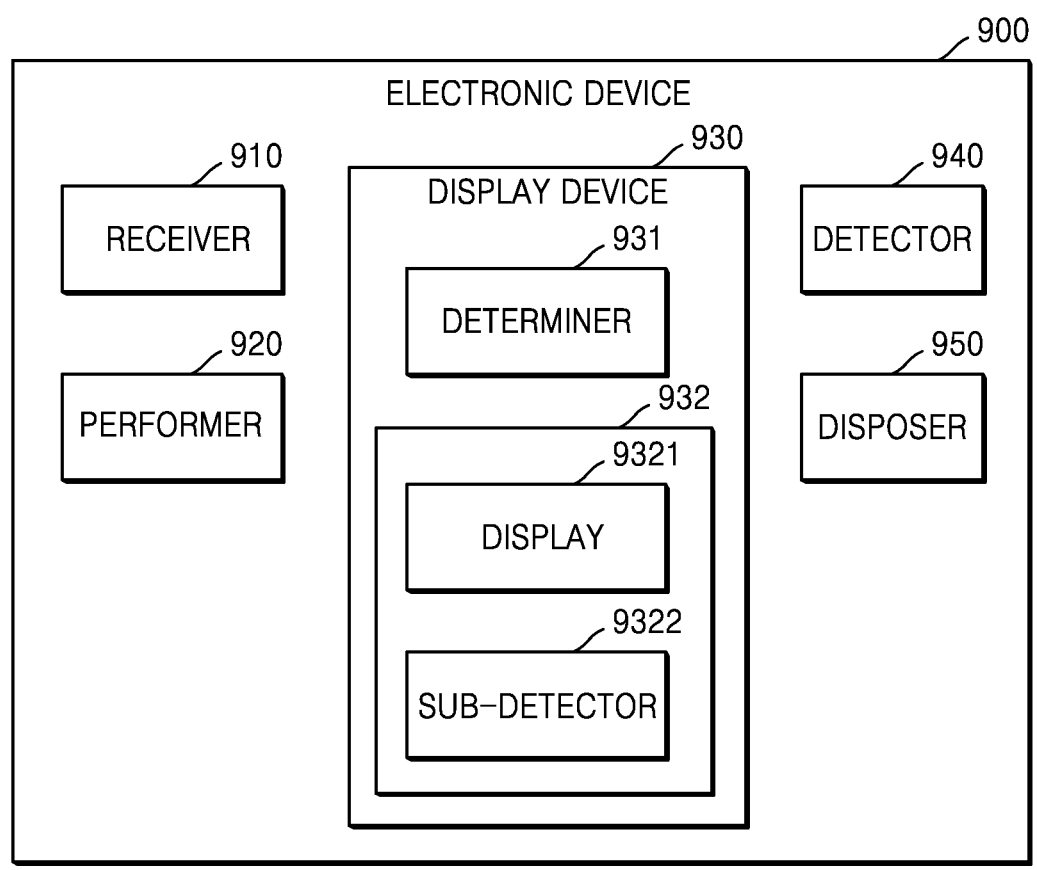
FIG. 9 is a block diagram of an apparatus for relocating an icon, according to an exemplary embodiment.

FIG. 9 is a block diagram of an apparatus for relocating an icon, according to an exemplary embodiment.

As shown in FIG. 9, an electronic device 900 may include a receiver 910 that receives a request for installing or updating an application, a performer 920 that installs or updates the application, a display device 930 including a display part 932 and displays an icon of the application, a detector 940 that detects a first operation with respect to the icon, and a disposer 950 that disposes the icon at a first target location in response to the first operation detected by the detector 940.

In an exemplary embodiment, the display device 930 may display the icon in a relocatable state.

In an exemplary embodiment, the display device 930 may display the icon in a draggable state.

In an exemplary embodiment, the display device 930 may display the icon in a jiggling state and/or a suspended state.

The display device 930 may display the icon to be transparent.

Furthermore, the display device 930 may further include a determiner 931 that determines a first target interface and determines a preset page of the first target interface, and the display part 932 displays the icon on the preset page that is determined by the determiner 931.

The display part 932 may include a display 9321 that displays the icon on an installation interface or an update interface, and a sub-detector 9322 that detects a second operation with respect to the icon that is displayed on the installation interface or the update interface by the display 9321. The display 9321 may jump-to-display the preset page, and may display the icon on the preset page in response to the second operation that is detected by the sub-detector 9322.

Although the above described components are illustrated as separate elements, it is merely an example, and some or all of the above described components may be integrated into a single component, e.g., a processor. Also, some or all of the above described components may be implemented by using one or more processors. For example, the one or more processors may include a central processor unit (CPU), a micro controller unit (MCU), or a micro processor unit (MPU).

Depending on embodiments, a part of the components illustrated in FIG. 9 may be omitted or changed, or other components may be further added.

In addition, the display 9321 may display the icon in an independent area. The independent area may remain displayed on a current screen when a currently displayed page is changed. The icon in the independent area may be moved and disposed on the currently displayed page that is changed.

The preset page may be a same category page. The same category page includes a page having at least one icon of at least one application that is in the same category as the application that is installed or updated.

Also, the same category page may be an expanded page of an application folder.

After the icon is disposed on the first target location by the disposer 950, the display device 930 may display the icon on a second target interface. The detector 940 detects a third operation with respect to the icon. The disposer 950 may dispose the icon on a second target location in response to the third operation that is detected by the detector 940.

The icon may be a software icon and/or a widget icon.

For example, after the performer 920 installs or updates the application according to the request for installing or updating the application that is received by the receiver 910, the display device 930 displays the icon of the application. Then, the disposer 950 disposes the icon on the first target location in response to the first operation.

Figure 10:
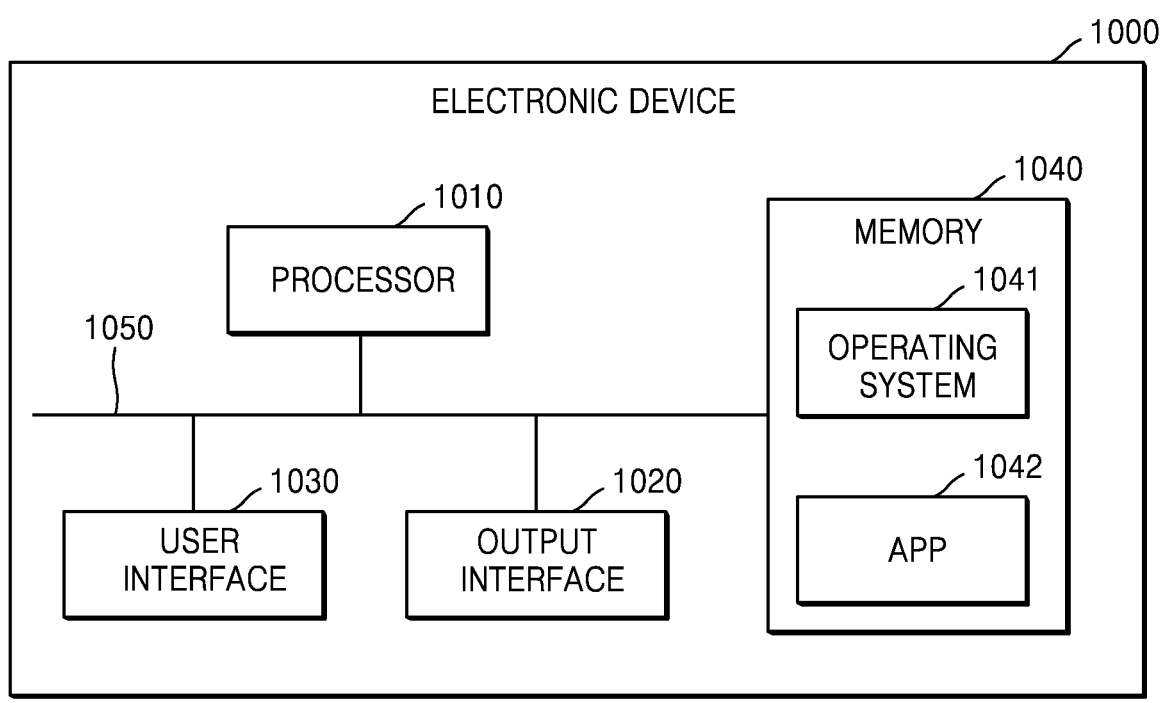
FIG. 10 is a block diagram of an electronic device, according to another exemplary embodiment.

FIG. 10 is a block diagram of an electronic device that relocates an icon, according to another exemplary embodiment.

As shown in FIG. 10, an electronic device 1000 may include at least one processor 1010, for example, a central processing unit (CPU), at least one output interface 1020, a user interface 1030, at least one memory 1040, and at least one communication bus 1050.

The communication bus 1050 is used for communication between the above-described components.

In an exemplary embodiment, the electronic device 1000 may include the user interface 1030 including a monitor, a keyboard, or a clicking device such as, for example, a mouse, a trackball, a touch-sensitive panel, or a touch screen.

The memory 1040 may include a high speed random access memory (RAM), a non-volatile memory, or a magnetic disk memory. In an exemplary embodiment, the memory 1040 may include at least one storage device that is remote from the processor 1010 or external to the processor 1010.

In some exemplary embodiments, the memory 1040 may store executable instructions or programs, data structures, or a subset or expansion set thereof.

The memory 1040 may include an operating system 1041 that includes various system programs for executing various tasks including hardware-based tasks, and an application APP 1042 that includes various applications for executing various application tasks.

Specifically, the APP 1042 may include, but is not limited to, a receiver that receives a request for installing or updating an application, a performer that installs or updates the application, a display that displays an icon of the application, a detector that detects a first operation with respect to the icon, and a disposer that disposes the icon on a first target location in response to the first operation that is detected by the detector.

The processor 1010 may perform operations by calling programs or instructions stored in the memory 1040. In particular, the processor 1010 may receive a request for installing or updating an application, install or update the application, display an icon of the application, detect a first operation with respect to the icon, and dispose the icon on a first target location in response to the first operation.

In an exemplary embodiment, the processor 1010 may display the icon in a relocatable state on a display (not shown).

In an exemplary embodiment, the icon may be displayed in a draggable state.

In an exemplary embodiment, the icon may be displayed in a jiggling state or a suspended state.

In an exemplary embodiment, the icon may be displayed in a transparent state.

Furthermore, the processor 1010 may determine a first target interface, determine a preset page of the first target interface, and display the icon on the preset page.

Also, the processor 1010 may display the icon on the installation interface or the update interface, detect a second operation with respect to the icon displayed on the installation interface or the update interface, and jump-to-display the preset page and display the icon on the preset page in response to the second operation.

Also, the processor 1010 may display the icon in an independent area. The independent area may remain displayed on a current screen when a currently displayed page is changed. The icon in the independent area may be moved and disposed on the currently displayed page that is changed.

Also, the processor 1010 may display the icon on a second target interface after the icon is disposed at the first target location, detect a third operation with respect to the icon, and dispose the icon on the second target location in response to the third operation.

Figure 11:
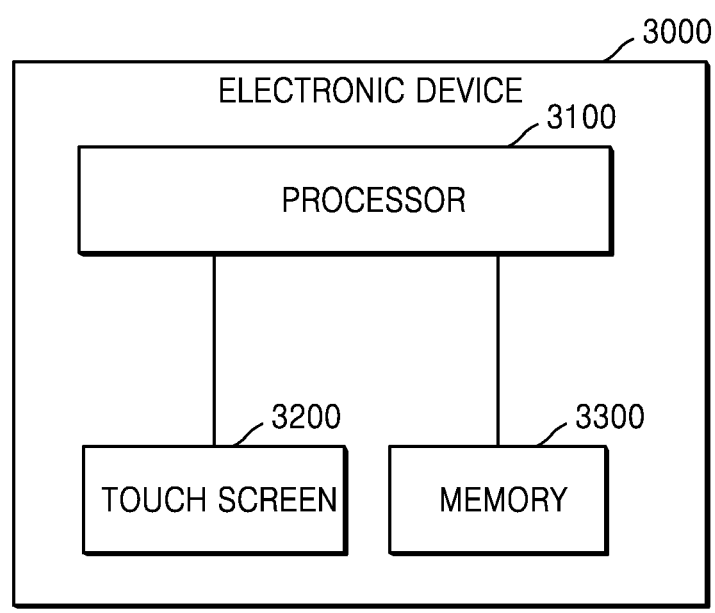
FIG. 11 is a block diagram of an electronic device, according to still another exemplary embodiment.

FIG. 11 is a block diagram of an electronic device 3000, according to still another exemplary embodiment. Referring to FIG. 11, the electronic device 3000 includes a processor 3100, a touch screen 3200, and a memory 3300. When the electronic device 3000 installs or updates an application, the electronic device 3000 displays an icon of the application in a state in which the icon may be relocated by the user, and relocates the icon according to an input of the user.

The touch screen 3200 may display an image under the control of the processor 3100. The touch screen 3200 may display an image that is received from the processor 3100.

Also, the touch screen 3200 detects an operation of the user. The touch screen 3200 may detect a touch operation of the user and output a detection result to the processor 3100.

The memory 3300 stores data. The memory 3300 may store data according to installation or update of the application.

The processor 3100 may install or update the application. The processor 3100 may download data for installing the application or updating the application according to an instruction of the user, and install or update the application.

The processor 3100 may display an icon (i.e., application icon) for an application that is being installed or updated during an installation or updating of the application on the touch screen 3200. The processor 3100 may display the icon on a page that indicates that installation or updating is in process. Alternatively, after the application is installed or updated, the processor 3100 may display the icon on the touch screen 3200. The processor 3100 may display the icon and a page that indicates that installation or updating is finished.

The processor 3100 may display the icon in a relocatable state on the touch screen 3200. The relocatable state refers to a state in which a location of the icon is not fixed and thus can be changed. Also, the processor 3100 may display the icon in a draggable state, a jiggling state, or a suspended state. Also, the processor 3100 may transparently display the icon. Also, the processor 3100 may display the icon of the installed or updated application in an area that is independent from an area where existing application icons are displayed.

When the icon is displayed in a relocatable state, the processor 3100 may display the icon in the relocatable state on a page. In other words, the processor 3100 may determine a page on which the icon is to be displayed and display the determine page, and the icon that overlaps the page. Alternatively, the processor 3100 may display a page in a first area and display the icon in a second area that is separated from the first area. In an exemplary embodiment, the processor 3100 may determine the page on which the icon is to be displayed based on a characteristic of the application corresponding to the icon.

The processor 3100 may determine a page to be displayed with the application icon. For example, the processor 3100 may determine a page that includes icons of applications in the same category as the application icon to be displayed with the application icon. Alternatively, the processor 3100 may display a page that includes a folder including icons of applications in the same category as the application icon, and/or an expanded page of the folder to be displayed with the application icon. The expanded page refers to a page that displays the icons in the folder when the folder is selected. The processor 3100 may display an installation page or an update page according to installation or updating of an application, and jump-to-display a page that is automatically determined when the installation or updating is finished. 'Jump-to-display' indicates that the processor 3100 displays a new page.

The processor 3100 may relocate the application to a target location according to an operation performed by the user on the application icon. The processor 3100 receives an input from the user with respect to the application icon that is displayed in a relocatable state. The user may relocate the application icon on the target location by touching and dragging the application icon. The processor 3100 moves the application icon according to the touch and drag operation of the user. When the user drops the application icon at the target location, the processor 3100 may display the application icon at the target location and release the relocatable state. The operation of dropping the application icon indicates that the user finishes a touch operation on the touch screen 3200. The releasing of the relocatable state indicates that the application icon is displayed in the same state (e.g., fixed state) as other existing icons.

Figure 12:
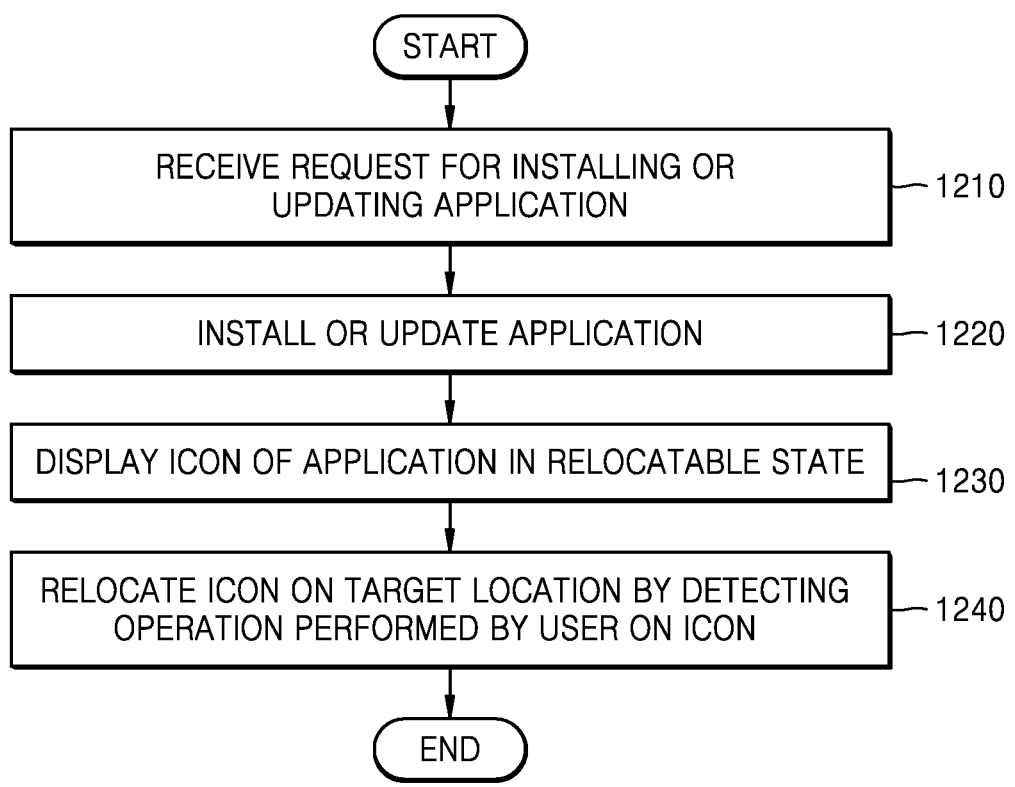
FIG. 12 is a flowchart of a method of relocating an application icon, according to still another exemplary embodiment.

FIG. 12 is a flowchart of a method of relocating an application icon, according to still another exemplary embodiment.

In operation 1210, an electronic device receives a request for installing or updating an application.

In operation 1220, the electronic device installs or updates the application.

In operation 1230, the electronic device displays an icon of the application in a relocatable state.

In operation 1240, the electronic device detects an operation performed by the user with respect to the icon, and relocates the icon on a target location.

As described above, an electronic device according to the exemplary embodiments may relocate an icon of an installed or updated application on a preset page.

The electronic device according to the exemplary embodiments may display the icon of the installed or updated application in a relocatable state.

The device described herein may include a processor, a memory for storing program data to be executed by the processor, a permanent storage unit such as a disk drive, a communications port for handling communications with external devices, and user interface devices, including a touch panel, keys, buttons, etc. When software modules or algorithms are involved, these software modules may be stored as program instructions or computer-readable codes executable on a processor on a computer-readable medium. Examples of the computer-readable recording medium include magnetic storage media (e.g., ROMs, floppy disks, hard disks, etc.), and optical recording media (e.g., compact disk (CD)-ROMs, or digital versatile disks (DVDs)). The computer-readable recording medium can also be distributed over network coupled computer systems so that the computer-readable code is stored and executed in a distributive manner. These media can be read by the computer, stored in the memory, and executed by the processor.

The methods according to the exemplary embodiments may be implemented by using functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems are not described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The inventive concept is not limited to the described order of the steps. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to one of ordinary skill in the art without departing from the spirit and scope.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of controlling an electronic apparatus, the method comprising:
    installing an application on the electronic apparatus or updating the application installed on the electronic apparatus based on a request received via a first interface for installing or updating the application;
    displaying an icon of the installed or updated application in a relocatable state based on completion of the installing or the updating of the application; and
    relocating the icon of the application displayed in the relocatable state based on detecting an operation to relocate the icon of the application displayed in the relocatable state and displaying the relocated icon, wherein the displaying the icon of the application in the relocatable state comprises, after the application is installed or updated, automatically jumping-to-display from the first interface to a preset page of a second interface and displaying at least a portion of the icon to be transparent on the preset page, and wherein the relocating comprises relocating the icon of which at least a portion is displayed to be transparent on the preset page to a target location based on detecting the operation to relocate the icon.

2. The method of claim 1, wherein the displaying the icon of the application in the relocatable state comprises displaying the icon in a draggable state based on the completion of the installing or the updating of the application.

3. The method of claim 1, wherein the displaying the icon of the application in the relocatable state comprises displaying the icon in at least one of a vibrating state and a suspended state based on the completion of the installing or the updating of the application.

4. The method of claim 1, wherein the automatically jumping-to-display comprises:
displaying the icon in the relocatable state on the first interface for installing or updating the application, and subsequently jumping-to-display to the preset page of the second interface.

5. The method of claim 4, wherein the preset page corresponds to a same category page on which at least one icon corresponding to at least one application that is in the same category as the installed or updated application is displayed.

6. The method of claim 4, wherein the preset page corresponds to an expanded page of an application folder, the application folder being a folder comprising at least one icon corresponding to at least one application that is in the same category as the installed or updated application.

7. The method of claim 6, wherein the expanded page corresponds to a page that is displayed based on selection of the application folder.

8. The method of claim 1, wherein the displaying the icon of the application in the relocatable state comprises displaying the icon in a first area of a screen, separate from a second area of the screen in which the preset page of the second interface is displayed, based on the completion of the installing or the updating of the application, and
wherein existing icons are disposed on the preset page of the second interface.

9. The method of claim 8, wherein, based on a change to the preset page of the second interface, the icon in the first area remains displayed on the screen.

10. An electronic apparatus comprising:
a display configured to display icons; and
at least one processor is configured to:
install an application on the electronic apparatus or update the application installed on the electronic apparatus based on a request received via a first interface for installing or updating the application,
control the display to display an icon of the installed or updated application in a relocatable state on the display based on completion of installing or updating of the application,
relocate the icon of the application displayed in the relocatable state to a target location according to an operation to relocate the icon of the application displayed in the relocatable state, and
control the display to display the relocated icon on the display, wherein the at least one processor is further configured to, after the application is installed or updated, control the display to automatically jump-to-display from the first interface to a preset page of a second interface and display at least a portion of the icon to be transparent on the preset page, and wherein the at least one processor is further configured to relocate the icon of which at least a portion is displayed to be transparent on the preset page to the target location based on detecting the operation to relocate the icon.

11. The electronic apparatus of claim 10, wherein the at least one processor is configured to control the display to display the icon in a draggable state on the display upon based on the completion of the installing or the updating of the application.

12. The electronic apparatus of claim 10, the at least one processor is configured to control the display to display the icon in at least one of a vibrating state and a suspended state on the display upon based on the completion of the installing or the updating of the application.

13. The electronic apparatus of claim 10, wherein the at least one processor is configured to control the display to display the icon in the relocatable state on the first interface for installing or updating the application, and subsequently jump-to-display to the preset page of the second interface.

14. The electronic apparatus of claim 13, wherein the preset page corresponds to a same category page on which at least one icon corresponding to at least one application that is in the same category as the installed or updated application is displayed.

15. The electronic apparatus of claim 13, wherein the preset page corresponds to an expanded page of an application folder, the application folder being a folder comprising at least one icon corresponding to at least one application that is in the same category as the installed or updated application.

16. The electronic apparatus of claim 15, wherein the expanded page corresponds to a page that is displayed based on selection of the application folder.

17. The electronic apparatus of claim 10, wherein the at least one processor is configured to control the display to display the icon in a first area of a screen, separate from a second area of the screen in which the preset page of the second interface is displayed, on the display upon based on the completion of the installing or the updating of the application, and
wherein existing icons are disposed on the preset page of the second interface.

18. The electronic apparatus of claim 17, based on a change to the preset page of the second interface, the at least one processor is configured to control the icon in the first area to remain displayed on the screen.

19. A non-transitory computer-readable recording medium having recorded thereon a program, which, when executed by a computer, causes the computer to perform the method of claim 1.

* * * * *